(12) United States Patent
Mahurkar et al.

(10) Patent No.: US 11,115,726 B2
(45) Date of Patent: Sep. 7, 2021

(54) CONTENT DELIVERY TO OVER THE TOP DEVICE FROM CUSTOMER PREMISES EQUIPMENT USING NOTIFICATIONS AND DYNAMIC PORT ASSIGNMENT

(71) Applicant: Verizon Patent and Licensing Inc., Arlington, VA (US)

(72) Inventors: Sagar Mahurkar, Frisco, TX (US); Anjaneya Pericharla, Irving, TX (US); Srinivasu Yelamarti, Flower Mound, TX (US); Saleem Khan Kamaludeen, Chennai (IN); Sanjay T. Ahuja, Irving, TX (US); Srirama R. Kalidindi, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 90 days.

(21) Appl. No.: 16/692,262

(22) Filed: Nov. 22, 2019

(65) Prior Publication Data
US 2021/0160586 A1 May 27, 2021

(51) Int. Cl.
*H04N 21/658* (2011.01)
*H04N 21/436* (2011.01)

(52) U.S. Cl.
CPC ... *H04N 21/6582* (2013.01); *H04N 21/43615* (2013.01)

(58) Field of Classification Search
CPC ......... H04N 21/6582; H04N 21/43615; H04N 21/637; H04N 21/6377; H04N 21/64707; H04N 21/436; H04N 21/437; H04N 21/4222; H04N 21/4108; H04N 21/4126; H04N 21/41407; H04N 21/4143; H04N 21/2223; H04N 21/2265; H04N 21/414; H04N 21/42684; H04N 21/43637; H04N 21/4516; H04N 21/6313; H04N 21/6181

See application file for complete search history.

(56) References Cited

U.S. PATENT DOCUMENTS

| | | | | |
|---|---|---|---|---|
| 2008/0263621 | A1* | 10/2008 | Austerlitz | H04N 21/4516 725/139 |
| 2010/0154021 | A1* | 6/2010 | Howarter | H04N 21/4331 725/141 |
| 2010/0303159 | A1* | 12/2010 | Schultz | H04N 21/44004 375/240.28 |
| 2011/0072484 | A1* | 3/2011 | Horen | H04N 21/4384 725/118 |
| 2012/0124145 | A1* | 5/2012 | Krietzman | G06Q 30/0251 709/206 |
| 2015/0067729 | A1* | 3/2015 | Yoon | G06F 3/0482 725/37 |
| 2016/0277909 | A1* | 9/2016 | Salvador | H04W 68/02 |
| 2018/0206122 | A1* | 7/2018 | Bradley | G06F 21/604 |

* cited by examiner

*Primary Examiner* — Alexander Gee

(57) ABSTRACT

A method, a device, and a non-transitory storage medium are described in which an inter-networked content service is provided. The inter-networked content service may allow an end device to receive content from a set top box when the end device is not connected to a local area network of the set top box. The inter-networked content service may provide for push notification messaging between the end device and the set top box to obtain network address, status, and port information in support of a content session.

20 Claims, 10 Drawing Sheets

CONTENT DELIVERY TO OVER THE TOP DEVICE FROM CUSTOMER PREMISES EQUIPMENT USING NOTIFICATIONS AND DYNAMIC PORT ASSIGNMENT

BACKGROUND

Development and design of networks present certain challenges from a network-side perspective and an end device perspective. Streaming and downloading of programs is a popular delivery mechanism for providing programs to users. A content delivery network (CDN) (also known as a content distribution network) is typically used for streaming and/or downloading programs.

DETAILED DESCRIPTION OF PREFERRED EMBODIMENTS

Figure 1:
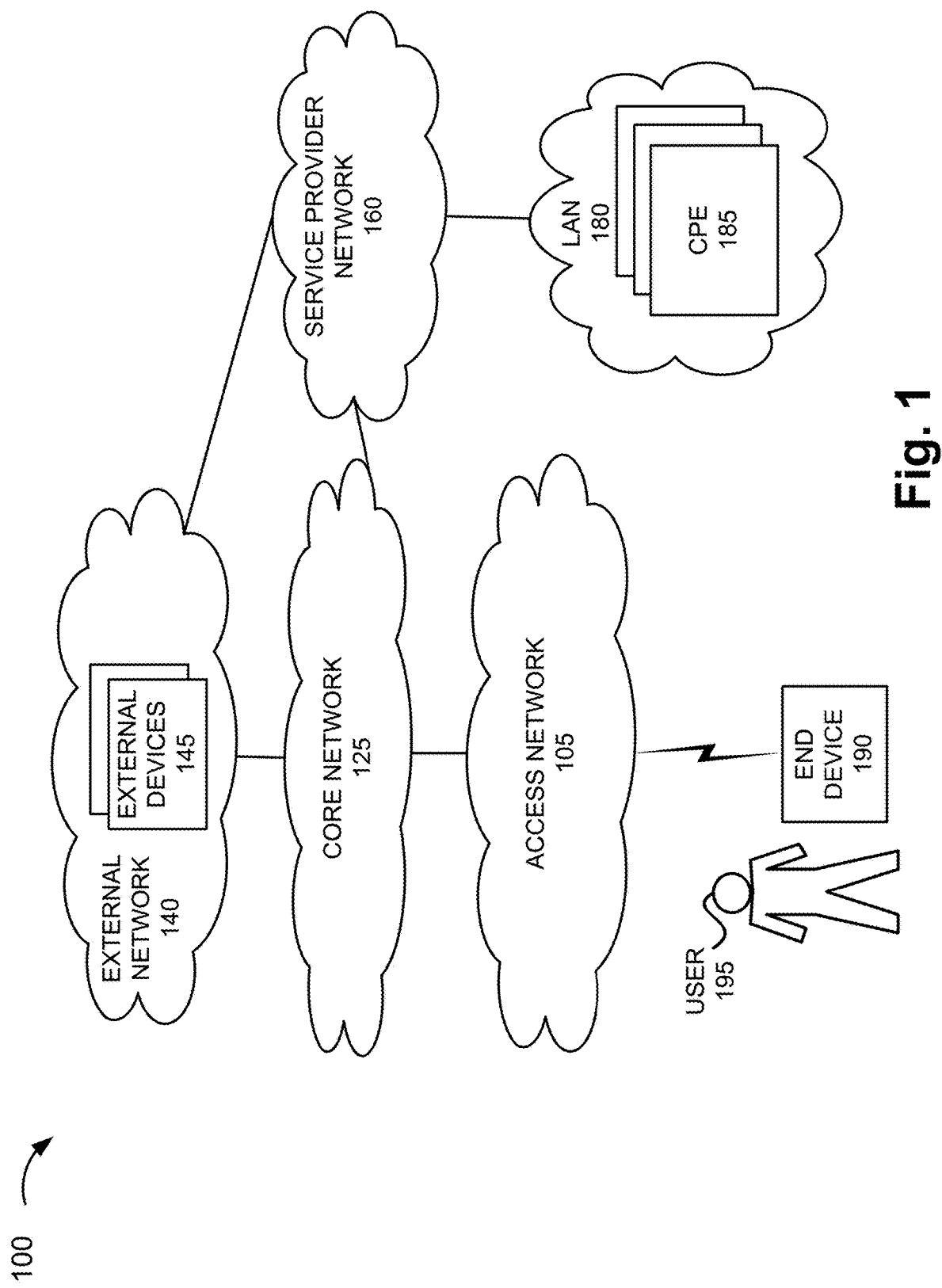
FIG. 1 is a diagram illustrating an exemplary environment in which an exemplary embodiment of a inter-networked content service may be implemented.

The following detailed description refers to the accompanying drawings. The same reference numbers in different drawings may identify the same or similar elements. Also, the following detailed description does not limit the invention.

Ubiquitous communication and information exchange offer users numerous advantages. There are a variety of end devices available to users, such as smartphones, tablets, netbooks, phablets, wearable devices, computers (e.g., laptops, desktops, etc.), and other types of user devices. These types of end devices, as well as other types, provide users with various applications and services, such as media services, communication services (e.g., telephone, video conferencing, messaging, etc.), navigation services, web browsing, business-related services, and other types of services and applications. Some end devices may use an over-the-top (OTT) application to receive content, such as video assets. Additionally, users may subscribe to a television service and have various types of customer premises equipment (CPE), such as a set top box or in-home server, and a router. The customer premises equipment may store various types of content, which may include video assets.

In some circumstances, a user may wish to initiate a streaming session or a downloading session with customer premises equipment that stores a desired content. For example, the end device may be connected to a mobile network and the customer premises equipment may be part of a local area network (LAN) associated with a service provider (e.g., a television service provider) and the user's residence. The LAN may include a wireless router, a broadband router, an access point, or another type of customer premises equipment that may not permit the user to initiate the streaming session or the downloading session with the customer premises equipment that stores the desired content.

According to exemplary embodiments, an inter-networked content service is described. According to an exemplary embodiment, an end device of a first network may communicate with a notification device via which dynamic access to content stored by a first customer premises equipment of a second network may be provided. According to an exemplary implementation, the first network may be a wide area network (WAN) or other type of mobile network. According to an exemplary implementation, the second network may be a LAN associated with the user of the end device and a television service and/or internet service provider network. According to an exemplary embodiment, the inter-networked content service may dynamically open a port of second customer equipment (e.g., a router, an access point, etc.) of the second network via which the end device may download or stream the content of the first customer premises equipment.

According to an exemplary embodiment, the end device may obtain port information from the second customer equipment via the first customer premises equipment and the notification device. The port information may allow the end device to stream content, issue commands, and provide security measures. According to an exemplary embodiment, the inter-networked content service may store and use tokens pertaining to the end device and the first customer premises equipment.

In view of the foregoing, the inter-networked content service may allow a user of an end device, which may not be directly connected to the network of customer premises equipment, to access content for delivery to the end device. The inter-network content service may support on-demand streaming (and/or downloading) of content from the customer premises equipment, provide security measures, and playback control, as described herein.

FIG. 1 is a diagram illustrating an exemplary environment 100 in which an exemplary embodiment of the inter-networked content service may be implemented. As illustrated, environment 100 includes an access network 105 a core network 125, an external network 140, a service provider network 160, and a local area network 180. External network 140 may include external devices 145, and local area network 180 may include customer premises equipment 185. Environment 100 further includes an end device 190, which may be operated by a user 195.

The number, type, and arrangement of networks illustrated in environment 100 are exemplary. Additionally, or alternatively, other networks not illustrated in FIG. 1 may be included in environment 100, such as a backhaul/fronthaul network or another type of intermediary network, as described herein.

The number, the type, and the arrangement of network devices in access network 105, core network 125, external network 140, and local area network 180, as illustrated and described, are exemplary. A single device in FIG. 1 may be implemented as multiple devices and/or multiple devices may be implemented as a single device. The number of end devices 190 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.)). Additionally, a network device may be implemented according to various computing architectures, such as centralized, distributed, cloud (e.g., elastic, public, private, etc.), edge, fog, and/or another type of computing architecture.

Environment 100 includes communication links between the networks, between network devices, and between end device 190 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Environment 100 may include various planes of communication including, for example, a control plane, a user plane, and a network management plane. Environment 100 may include other types of planes of communication. A message communicated in support of the inter-networked content service may use at least one of these planes of communication. Additionally, an interface of a network device may be modified (e.g., relative to an interface defined by a standards body, such as Third Generation Partnership Project (3GPP), International Telecommunication Union (ITU), European Telecommunications Standards Institute (ETSI), etc.) or a new interface of the network device may be provided in order to support the communication (e.g., transmission and reception of messages, information elements (IE), attribute value pairs (AVPs), etc.) between network devices and the inter-networked content service logic, as described herein. According to various exemplary implementations, the interface of the network device may be a service-based interface or a reference point-based interface.

Access network 105 may include one or multiple networks of one or multiple types and technologies. For example, access network 105 may include a Fourth Generation (4G) radio access network (RAN), a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, or another type of network (e.g., a legacy Third Generation (3G) RAN, etc.) that may be considered an access network. Additionally, or alternatively, access network 105 may include a wired network, an optical network, or another type of network that may provide an on-ramp to access network 105, core network 125, and/or external network 140.

Depending on the implementation, access network 105 may include one or multiple types of network devices. For example, access network 105 may include an evolved Node B (eNB), a next generation Node B (gNB), an evolved Long Term Evolution (eLTE) eNB, a radio network controller (RNC), a remote radio head (RRH), a baseband unit (BBU), a centralized unit (CU), a distributed unit (DU), a small cell node (e.g., a picocell device, a femtocell device, a microcell device, a home eNB, etc.), a future generation wireless access device, another type of wireless node (e.g., a WiFi device, a WiMax device, etc.) that provides a wireless access service, or other another type of network device that provides a transport service (e.g., routing and forwarding), such as a router, a switch, or another type of layer 3 (e.g., network layer of the Open Systems Interconnection (OSI) model) network device. Access network 105 may include wired and/or optical devices that provide network access.

Core network 125 may include one or multiple networks of one or multiple types and technologies. According to an exemplary embodiment, core network 125 includes a complementary network of access network 105. For example, core network 125 may be implemented to include an EPC of an LTE network, an LTE-A network, an LTE-A Pro network, a next generation core (NGC) network, and/or a future generation network. Core network 125 may include a legacy core network.

Depending on the implementation, core network 125 may include various types of network devices. For example, core devices 155 may include a mobility management entity (MME), a packet gateway (PGW), a serving gateway (SGW), a home agent (HA), a GPRS support node (GGSN), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), a network data analytics function (NWDAF), a network exposure function (NEF), and/or an application function (AF). According to other exemplary implementations, core devices 155 may include additional, different, and/or fewer network devices than those described. For example, core devices 155 may include a non-standard and/or a proprietary network device, or another type of network device that may be well-known but not particularly mentioned herein.

External network 140 may include one or multiple networks. For example, external network 140 may be implemented to include a service or an application-layer network, the Internet, the World Wide Web (WWW), an Internet Protocol Multimedia Subsystem (IMS) network, a Rich Communication Service (RCS) network, a cloud network, a packet-switched network, a data center, a private network, a public network, or other type of network that hosts an end device application or service.

External devices 145 may include a network device that provides an inter-networked content service. According to an exemplary embodiment, external devices 145 may be configured to provide inter-network services for end device 190 and customer premises equipment 185. According to an exemplary embodiment, external devices 145 may receive a request from end device 190, may communicate the request to customer premises equipment 185, and may provide a response, which includes a network address (e.g., an Internet Protocol (IP) address) of the customer premises equipment 185 that stores content and status information, as described herein. According to an exemplary embodiment, external devices 145 may receive another request from end device 190, may communicate the request to customer premises equipment 185, and may provide a response, which includes port information, as described herein. For example, the port information may include a Web port, a streaming port (e.g., a Hypertext Transfer Protocol (HTTP) Live Streaming (HLS) port, etc.), and a Digital Transmission Content Protection (DTCP) port or other type of cryptographic protocol port, which may support content protection, authentication, key exchange, and so forth. External devices 145 may further include a network device that stores token information pertaining to end device 190 and customer premises equipment 185, as described herein. External devices 145 are described further below.

Service provider network 160 may include one or multiple networks of one or multiple technologies that may provide contents to customers via a television service. Service provider network 160 may be implemented as a satellite-based network, a terrestrial-based network, or a combination thereof. Service provider network 160 may distribute contents to customers using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, service provider network 160 may include various types of network devices that contribute to the provisioning and distribution of contents. For example, service provider network 160 may include network devices that provide various content services, such as a content processing device (e.g., transcoding, encryption, etc.), a digital rights management device, a licensing device, a content storage device, a metadata storage device, a content server device, a billing device, a content recommendation device, a user account management device, and/or other types of network device that may contribute to the television service.

Local area network 180 may include a network that supports the service provider network 160 at a customer's residence or other locale (e.g., a business, etc.). Customer premises equipment 185 may include various types of devices pertaining to a television service and/or internet service. For example, customer premises equipment 185 may include a content server that may store contents, and may disburse contents to other devices (e.g., a set top box, a television, and other types of user devices) by way of streaming and/or downloading. For example, the content server may be a computer, an in-home media device, or some other suitable computational device that may provide a content service for multiple devices (e.g., a set top box, an end device, etc.).

Customer premises equipment 185 may include a router. For example, the router may be implemented as an in-home router device, a broadband router, or a wireless router. The router may include wireless, optical, and/or wired capabilities. According to an exemplary embodiment, the router includes logic that provides an inter-networked content service, as described herein.

Customer premises equipment 185 may include a set top box. For example, the set top box may be implemented as a converter box, a receiver device, a tuner device, a digibox, an IPTV set top box, or some other type of (in-home) media device. The set top box may include optical, wireless, and/or wired capabilities. The set top box may provide various television services, such as on-demand, pay-per-view, contents of a service subscription, and various types of interfaces. Additionally, according to an exemplary embodiment, the set top box may store contents. For example, a customer may download and/or record content associated with a television service. According to an exemplary embodiment, the set top box includes logic that provides an inter-networked content service, as described herein.

Customer premises equipment 185 may include a television, such as a non-smart television, a smart television, or some other form of a display device. The customer premises equipment described are exemplary, and additional, fewer, and/or different types of devices may be implemented.

End device 190 includes a device that has computational and communicative capabilities (e.g., wired, wireless, optical, etc.). Depending on the implementation, end device 190 may be a mobile device, a portable device, a stationary device, a device operated by a user (e.g., user equipment (UE), and so forth. For example, end device 190 may be implemented as a smartphone, a mobile phone, a personal digital assistant, a tablet, a netbook, a phablet, a wearable device (e.g., glasses or other type of head gear), a computer, a device in a vehicle, or other types of wireless, wired, and/or optical devices. End device 190 may be configured to execute various types of software (e.g., applications, programs, etc.). The number and the types of software may vary among end devices 190. According to an exemplary embodiment, end device 190 includes logic that provides an inter-networked content service, as described herein. For example, end device 190 may include software via which user 195 may invoke the inter-networked content service, as described herein. User 195 may stream or download content stored by customer premises equipment 185 when end device 190 is not connected to LAN 180.

Figure 2A:
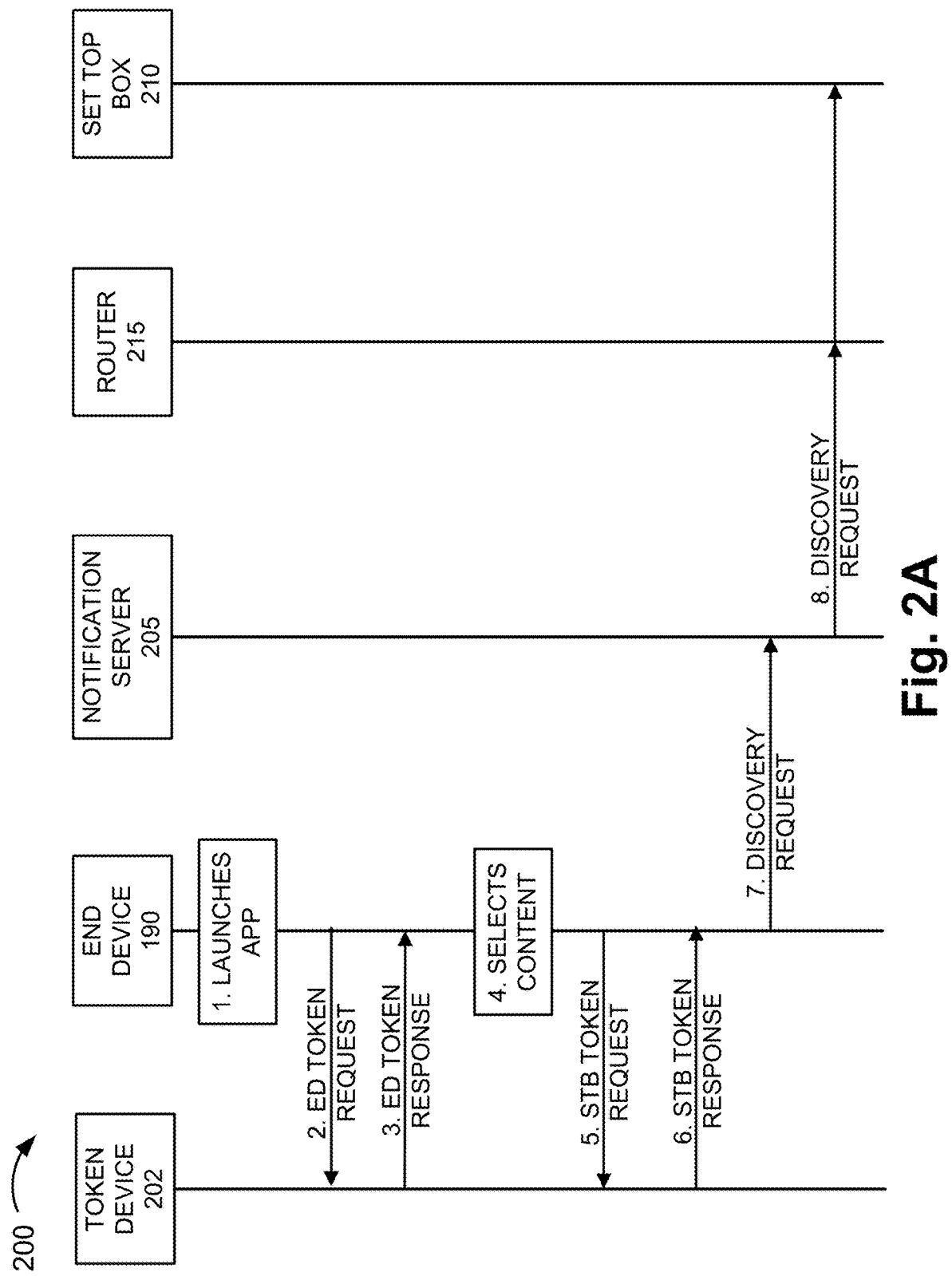
FIGS. 2A-2C are diagrams illustrating an exemplary process of an exemplary embodiment of the inter-networked content service.
Figure 2B:
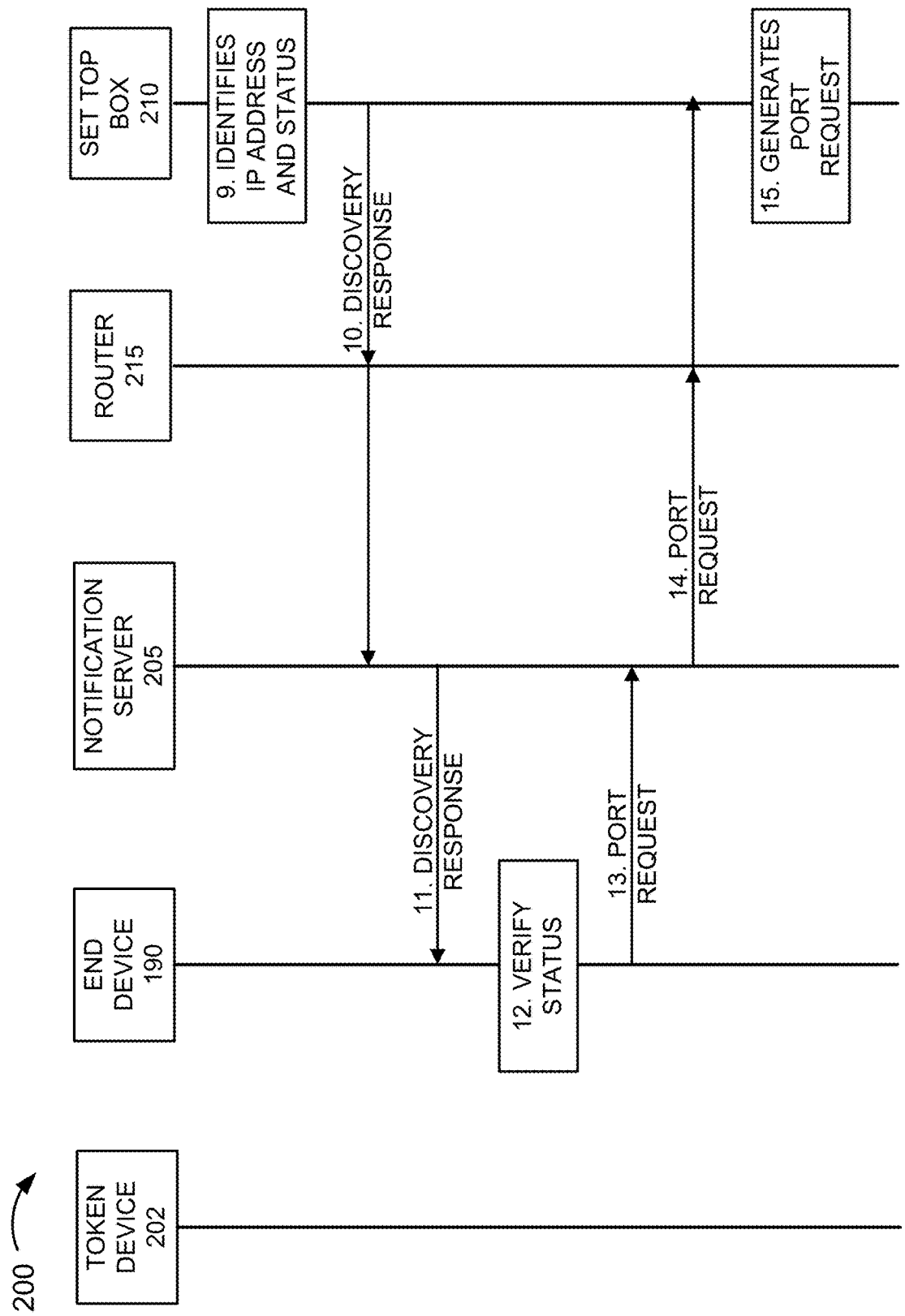
Figure 2C:
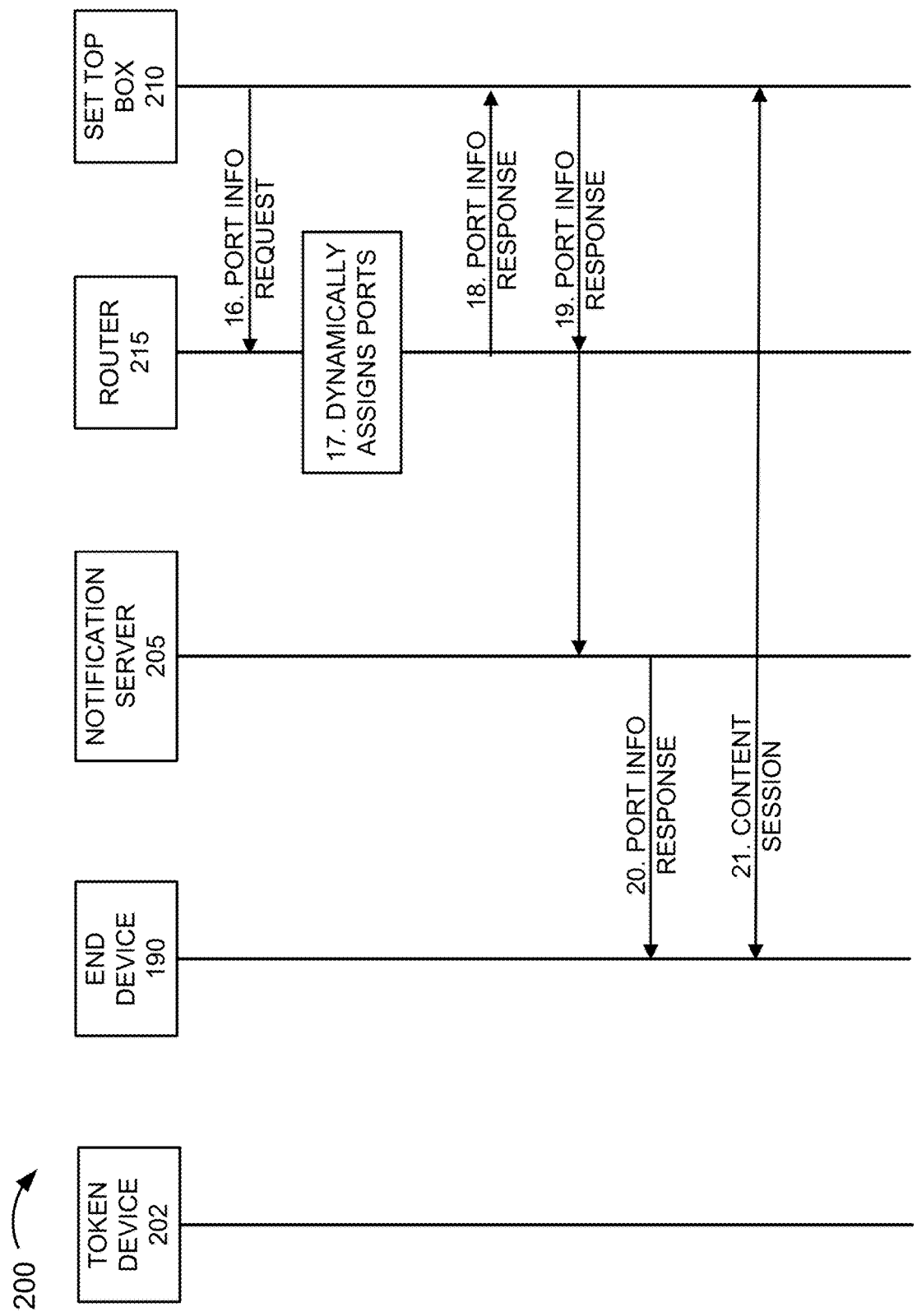

FIGS. 2A-2C are diagram illustrating an exemplary process in which an exemplary embodiment of the inter-networked content service may be implemented. Referring to FIG. 2A, according to an exemplary embodiment, external devices 145 of FIG. 1 may include a token device 202 and a notification server 205. Additionally, according to an exemplary embodiment, customer premises equipment 185 may include a set top box 210 and a router 215.

According to an exemplary embodiment, referring to FIGS. 1 and 2A, assume end device 190 may be attached to core network 125 via access network 105. In this regard, user 195 and end device 190 are not directly (and indirectly) connected to LAN 180. For purposes of illustration and description, according to an exemplary scenario, assume user 195 may be traveling and away from his/her home and LAN 180.

In step (1), user 195 may launch an application of end device 190. The application may include logic that supports inter-networked content service and allows user 195 to select content stored at set top box 210 for download or streaming to end device 190. In step (2), based on the execution of the (mobile) application, end device 190 may transmit a request for an end device token to token device 202. The request may include an identifier that identifies end device 190. Additionally, or alternatively, the request may include an identifier that identifies user 195 and/or a service (e.g., a television service, an inter-networked service, etc.) Token device 202 may be implemented as a network device that stores tokens in support of and for use by the inter-networked content service. For example, the tokens may be used for notification messaging (e.g., a push notification service) between end device 190 and set top box 210. Depending on the platform of end device 190 (e.g., operating system of the end device, etc.) and corresponding push notification service, token device 202 may store and provide different types of tokens to requesting end devices 190.

Figure 3:
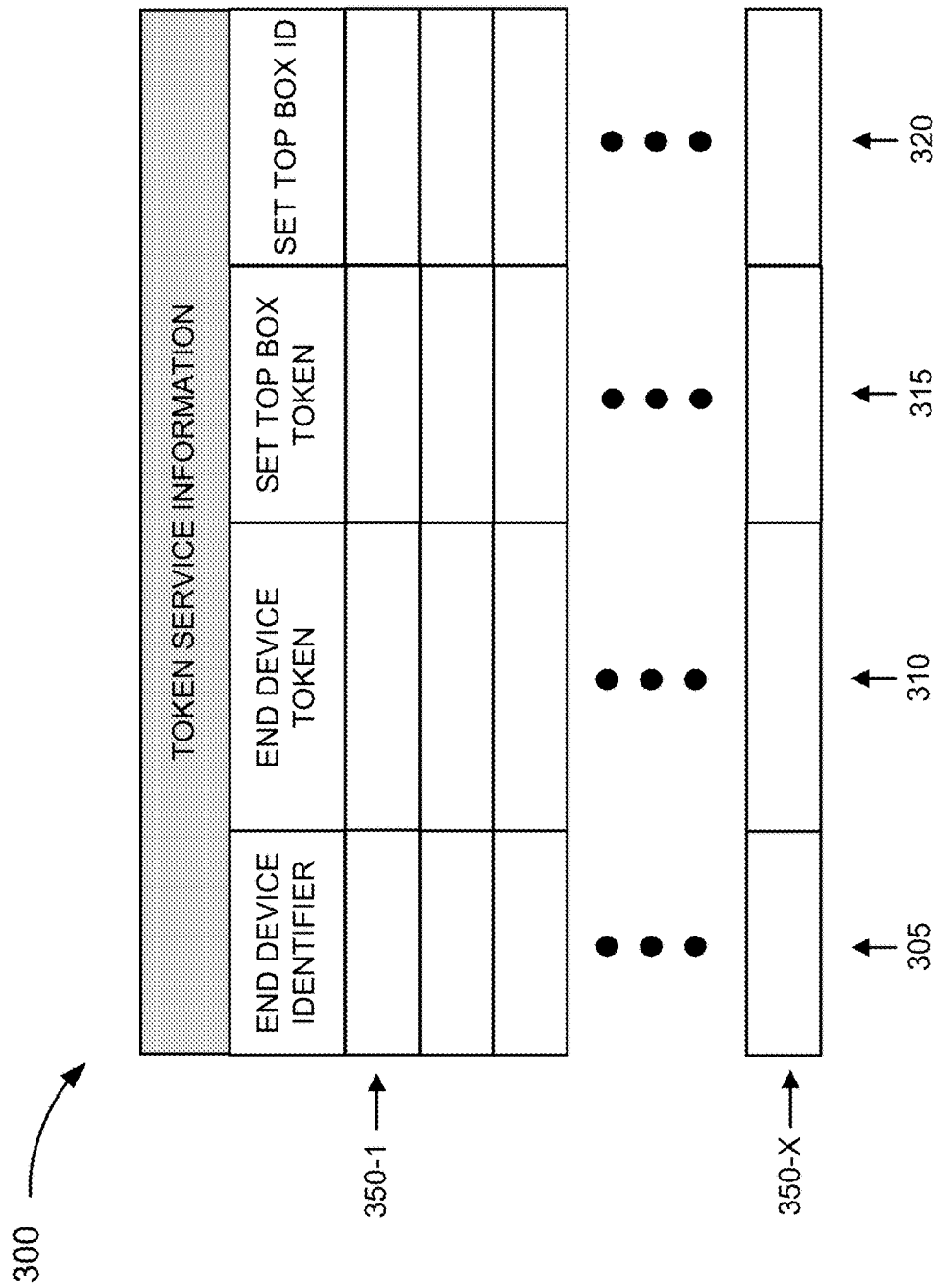
FIG. 3 is a diagram illustrating exemplary token service information that supports the inter-networked content service.

FIG. 3 is a diagram of exemplary token service information that may be stored in a table 300. As illustrated, table 300 may include an end device identifier field 305, an end device token filed 310, a set top box token field 315, and a set top box identifier field 320. As further illustrated, table 300 includes records 350-1 through 350-X (also referred to as records 350, or individually or generally as record 350) that each includes a grouping of fields 305, 310, and 315. Token service information is illustrated in tabular form merely for the sake of description. In this regard, token service information may be implemented in a data structure different from a table. Although the token service information may include a token and a unique identifier pertaining to set top box 210, according to other exemplary embodiments, other types of customer premises equipment 185 that may store and provide downloading and/or streaming of contents may be implemented.

End device identifier field 305 may store data that indicates an identifier for end device 190. For example, end device identifier field 305 may store a permanent equipment identifier (PEI), a subscription permanent identifier (SUFI), an International Mobile Station Equipment Identity (IMEI), a Mobile Equipment Identifier (MEID), a serial number, or some other type of end device identifier (e.g., a Media Access Control (MAC) address, etc.). Additionally, or alternatively, end device identifier field 305 may store an identifier pertaining to the software (e.g., the mobile application, etc.) that provides the inter-networked content service, an identifier that may be correlated to a television service, a user subscription, LAN 180, or some other correlated factor. According to some implementations, the identifier of end device 190 may be unique.

End device token field 310 may store data indicating a push token or a device token pertaining to end device 190. The token may be issued by a notification service (e.g., a push notification service, etc.). The token may allow the notification service to route a message and ensure the notification may be delivered to a unique application-device combination for which it is intended. The value of the token may be updated over time (e.g., change value every X number of days, etc.).

Set top box token field 315 may store data indicating a push token or a device token pertaining to set top box 210. The token may be issued by the notification service. The token may allow the notification service to route a message and ensure the notification may be delivered to a unique application-device combination for which it is intended. The value of the token may be updated over time (e.g., change value every X number of days, etc.).

Set top box identifier field 320 may store data that indicates an identifier for set top box 210. For example, set top box identifier field 305 may store a permanent equipment identifier (PEI), a subscription permanent identifier (SUPI), a MAC address, a user subscription identifier pertaining to a television service, or an identifier indicating LAN 180. Additionally, or alternatively, set top box identifier field 320 may store a unique identifier pertaining to the software that provides the inter-networked content service. According to some implementations, the identifier of set top box 210 may be unique.

According to other exemplary implementations, table 300 may store additional, fewer, and/or different instances of token service information in support of the inter-networked content service, as described herein. For example, table 300 may include a user field that includes data indicating a user associated with a mobile service, a television service, and/or the inter-networked content service.

Referring back to FIG. 2A, in response to receiving the token request, token device 202 may perform a look-up. For example, token device 202 may compare an end device identifier, which may be included in the received end device token request, to end device identifier field 305, and determine a match. In step (3), token device 202 may transmit an end device response, which includes an end device token of end device token field 310.

In step (4), user 195 may browse, via an interface of the launched application, available contents that are stored in one or multiple set top boxes 210 of LAN 180. User 195 may select a content to watch via streaming or download.

In step (5), in response to the selection, end device 190 (e.g., the application) may generate and transmit a request for a set top box token. The request may include the end device identifier and an identifier of the selected content. The request may include an identifier that identifies set top box 210 that stores the content. For example, the application of end device 190 may be updated as content is added to and deleted from set top box 210. The application may also include a set top box identifier of set top box 210 that stores the content that may be added. According to other exemplary implementations, the application may not store the set top box identifier, or may store the set top box identifier when there are multiple set top boxes 210 in LAN 180. In step (6), token device 202 may receive the request and perform a look-up. For example, token device 202 may compare the information included in the request with the stored token service information, and identify a match. Token device 202 may generate and transmit a set top box response based on the result of the look-up. The set top box response may include one or multiple set top box tokens. For example, according to an exemplary implementation, the set top box token may correspond to a set top box that stores the content. According to other exemplary implementations in which the set top box identifier may not be used and there are multiple set top boxes 210 in LAN 180, the set top box response may include a set top box token for a set top box that does not store the content.

In step (7), in response to receiving the set top box token response, end device 190 may generate and transmit a discovery request to notification server 205. Notification server 205 may include a network device that provides a push notification service. As described herein, notification server 205 may route push notification messages (e.g., discovery requests, discovery responses, port requests, port responses, etc.) between end device 190 and set top box 210.

The discovery request may include a set top box token, an end device token, and a discovery tag. The discovery tag may be a flag or other type of data instance that requests a network address of set top box 210 (e.g., an IP address, etc.) and a device status of set top box 210. For example, the device status may indicate whether set top box 210 is on or off. The device status may indicate other information or an error that may prevent set top box 210 from supporting a prospective content session. For example, the device status may indicate whether or not set top box 210 is undergoing an update, has sufficient bandwidth to support the downloading or streaming of a content, and/or other information that end device 190 may use to determine whether or not a content session may be invoked. The discovery request may also include a content identifier that identifies the selected content in step (4).

In step (8), notification server 205 may receive the discovery request, and routes the discovery request to set top box 210 of LAN 180. For example, notification server 205 may include forwarding logic that maps the set top token to a network address based on the (push) notification service. The (push) notification service may include that, for example, responsive to a triggering event (e.g., boot-up, ping timer, etc.), set top box 210 and/or router 215 may provide a network address to notification server 205. The network address may be mapped or correlated to tokens pertaining to set top box 210 and/or router 215, as described herein.

Referring to FIG. 2B, in step (9), according to an exemplary scenario, assume that set top box 210 is turned on. Set top box 210 may receive and interpret the discovery request, and in response, identify its network address (e.g., IP address, etc.) and status. For example, set top box 210 may interpret the discovery tag and gather this information. In step (10), set top box 210 may generate and transmit a discovery response. For example, the discovery response may include the IP address of set top box 210 and status information. According to some exemplary implementations, the discovery response may indicate whether the selected content is stored or not by set top box 210. The discovery response may also include other information (e.g., set top box token, end device token, etc.).

In step (11), notification server 205 may receive the discovery response, and route the discovery response to end device 190. In step (12), end device 190 may receive and interpret the discovery response. End device 190 may verify that the status information indicates that set top box 210 may support the content session (e.g., download or streaming of the selected content). According to this exemplary scenario, assume that end device 190 determines that set top box 210 is available to support the content session. Based on this determination, end device 190 may generate and transmit a port request. The port request may include a port tag. For example, the port tag may include a request for port information, which may pertain to router 215, and a request to open a port in support of the prospective content session. According to an exemplary implementation, the port information may include a request for a port value that supports a streaming session (e.g., an HLS port or other type of streaming technology port) or a downloading session, a Web port or other type of port that supports playback commands (e.g., stop, play, pause, fast-forward, rewind, etc.), and a DTCP port or other type of cryptographic protocol port. According to other exemplary implementations, the port information may include additional, fewer, and/or different instances of port information.

In step (13), end device 190 may generate and transmit a port request, and in step (14), notification server 205 may receive and route the port request to set top box 210. In step (15), set top box 210 may receive and interpret the port request. Set top box 210 may generate a port request to be transmitted to router 215. For example, set top box 210 may generate a request that uses an internal protocol (e.g., an in-home communication protocol, proprietary, or other non-standard protocol) to communicate with router 215. According to other examples, this may not be the case. In step (16), set top box 210 may transmit a port information request. In step (17), router 215 receives and interprets the request. In response, router 215 may determine whether the requested ports are available for assignment. According to this exemplary scenario, assume that router 215 determines that there are available ports to assign. Based on this determination, router 215 may dynamically assign the requested ports, and generate and transmit a port information response that indicates the assigned ports, as illustrated in step (18).

In step (19), notification server 205 may receive the port information response, and in step (20) route the port information response to end device 190. In step (21), end device 190 may establish a content session with set top box 210 via router 215. For example, referring to FIG. 1, a network device of core network 125 (e.g., a PGW or a UPF) may establish a bearer with set top box 210 via router 215 and service provider network 160. According to other examples, a different network path may be used (e.g., via external network 140 and service provider network 160).

FIGS. 2A-2C illustrate an exemplary process of the inter-networked content service, according to other exemplary embodiments, the process may include additional, different, and/or fewer steps. According to other exemplary embodiments, the port assignment may pertain to set top box 215. For example, steps (16)-(18) may be omitted, and set top box 210 may dynamically assign the ports used to support the prospective content session. In this regard, the content session may be between end device 190 and set top box 210 without router 215. According to such an embodiment, the content session does not traverse notification server 205. Additionally, or alternatively, although FIGS. 2A and 2B illustrate indirect communication between notification server 205 and set top box 210 via router 215, according to other exemplary implementations, these communications may be direct, without router 215. For example, the discovery request, the discovery response, the port request, the port response may not propagate via router 215. Additionally, or alternatively, according to other exemplary embodiments, notification server 205 may be included in the content session. For example, end device 190 may use a notification service of notification server 205 to support playback commands directed to set top box 210, when the content session is a streaming session.

Figure 4:
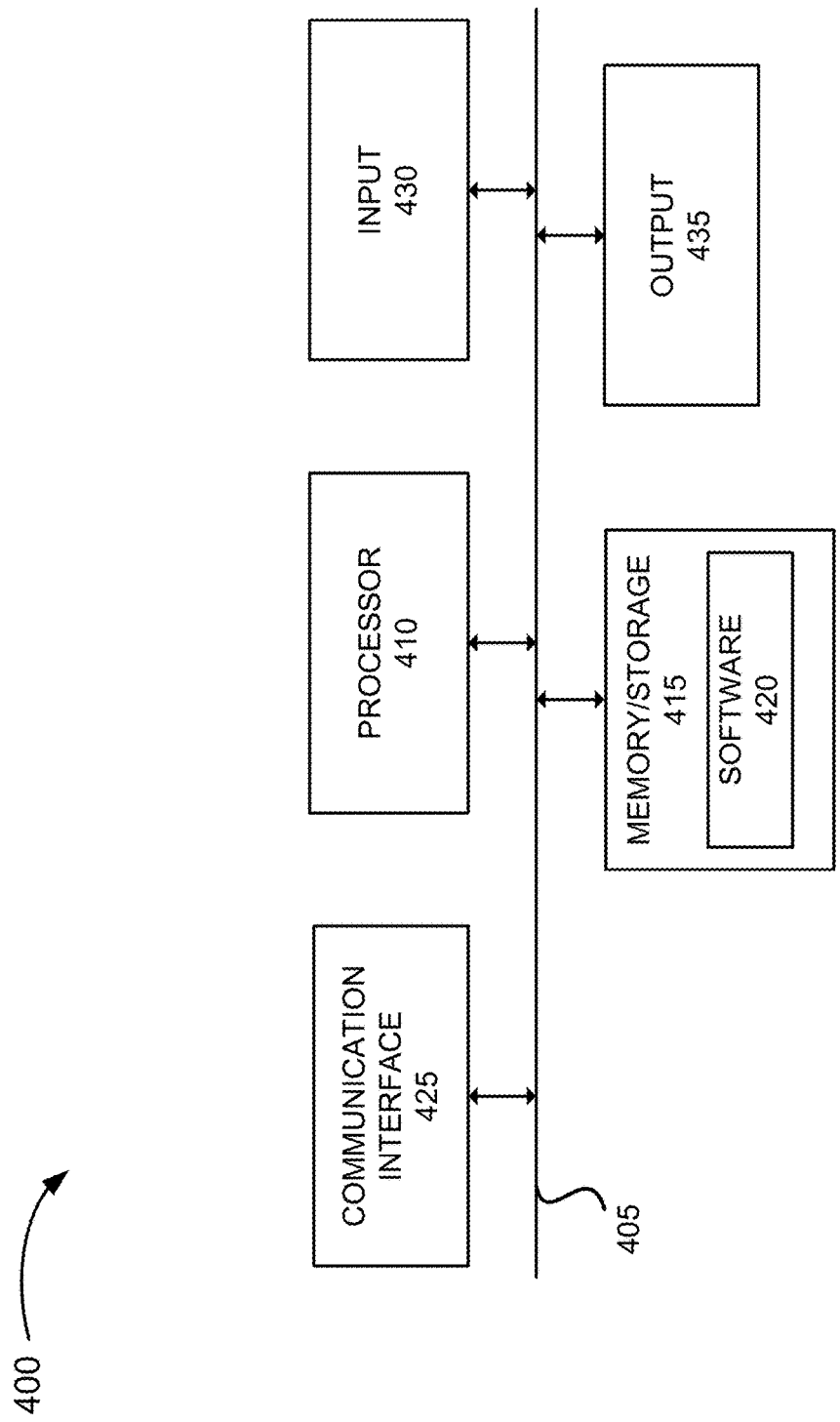
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to external devices 145, customer premise equipment 185, end device 190, security device 202, notification server 205, set top box 210, router 215, and other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to end device 190, software 420 may include an application that, when executed by processor 410, provides a function and/or a process of the inter-networked content service, as described herein. Additionally, for example, with reference to token device 202, notification server 205, set top box 210, router 215, and other types of devices, as described herein, software 420 may include an application that, when executed by processor 410, provides a function of the inter-networked content service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life-cycle (e.g., refreshed, paused, suspended, rebooting, or another type of state or status), using well-known virtualization technologies (e.g., hypervisor, container engine, virtual container, virtual machine, etc.) in a network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process and/or a function, as described herein. Alternatively, for example, according to other implementations, device 400 performs a process and/or a function as described herein based on the execution of hardware (processor 410, etc.).

Figure 5A:
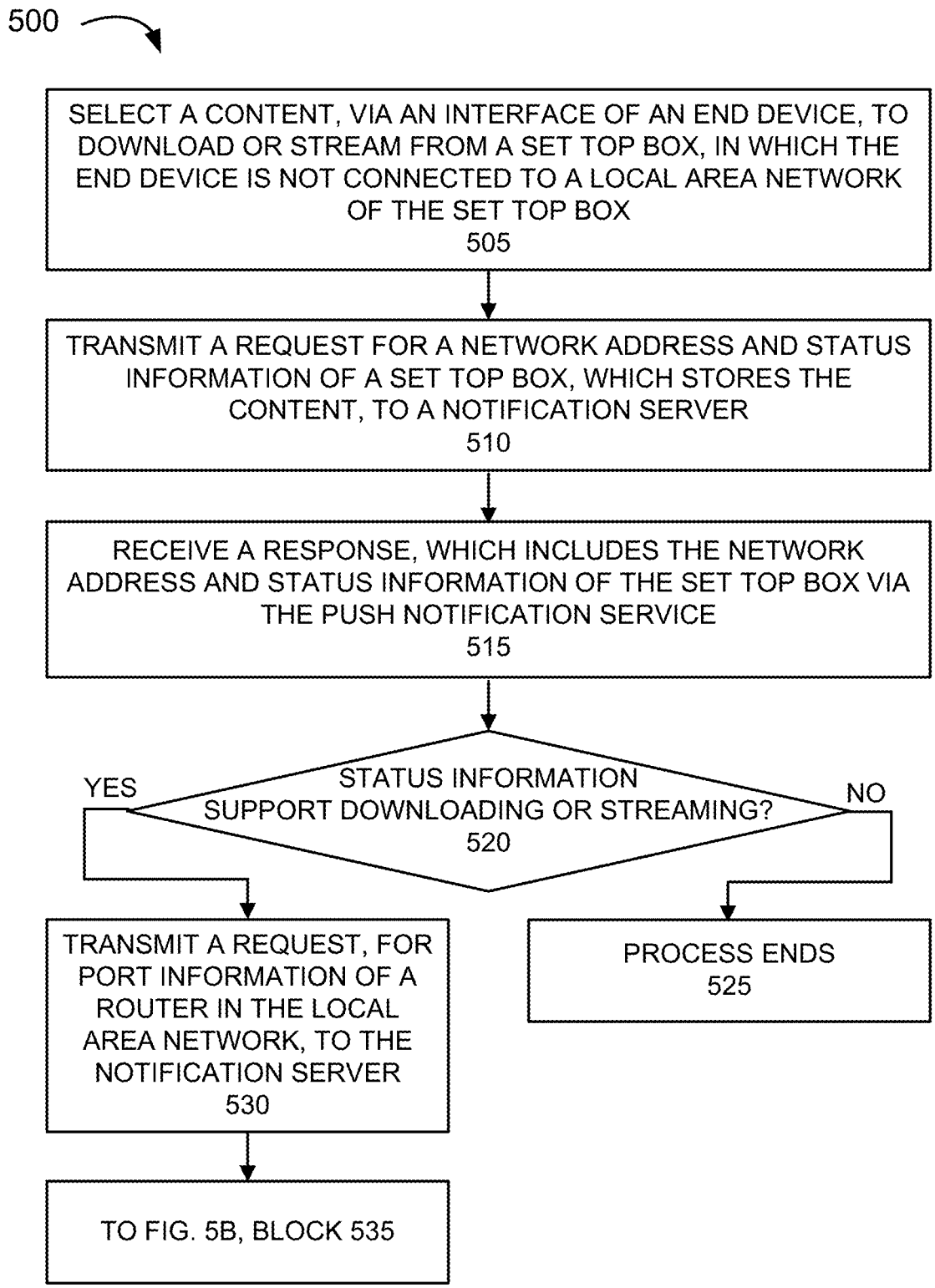
FIGS. 5A and 5B are flow diagrams illustrating an exemplary process of an exemplary embodiment of the inter-networked content service.
Figure 5B:
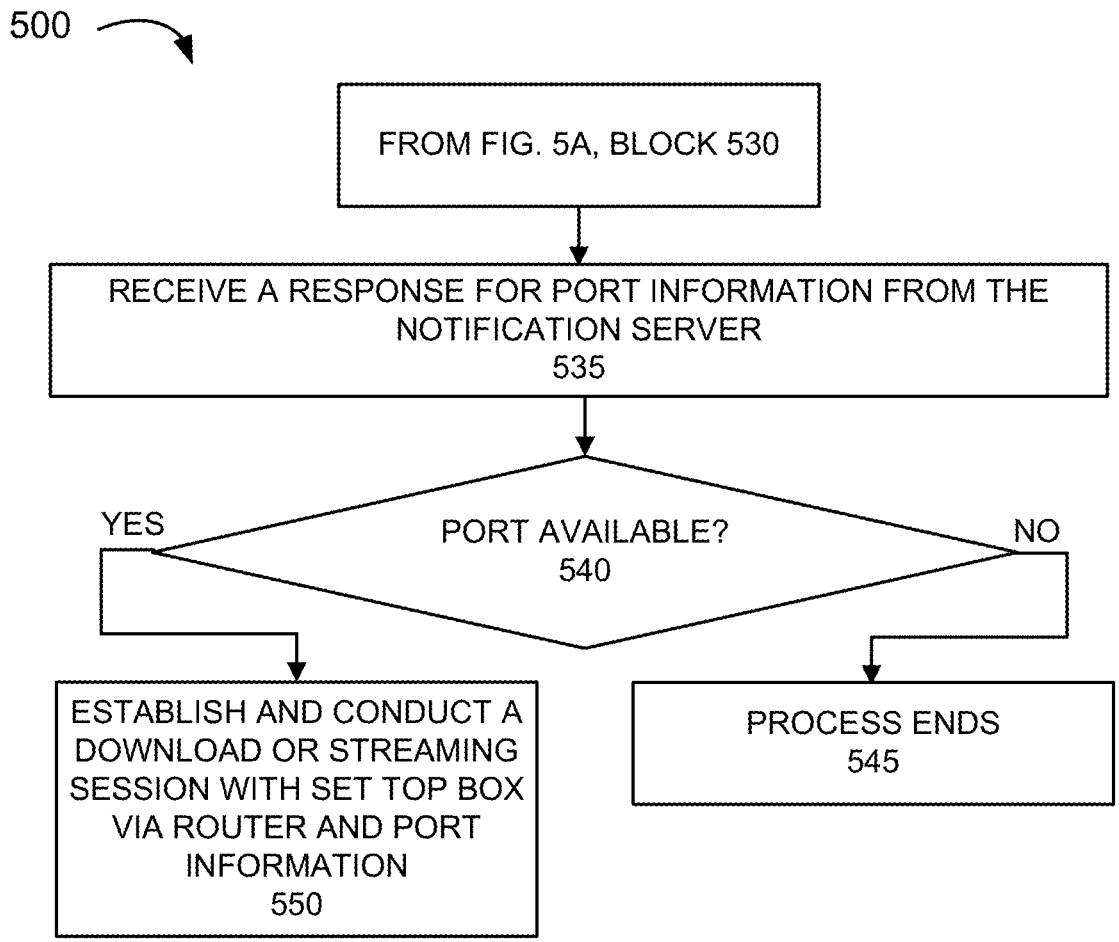

FIGS. 5A and 5B are a flow diagram illustrating an exemplary process 500 of an exemplary embodiment of the inter-networked content service. According to an exemplary embodiment, end device 190 may perform steps of process 500. According to an exemplary implementation, processor 410 executes software 420 to perform a step illustrated in FIGS. 5A and 5B, and described herein. Alternatively, a step illustrated in FIGS. 5A and/or 5B and described herein, may be performed by execution of only hardware.

Referring to FIG. 5A, in block 505, user 195 of end device 190 may select a content, via a graphical user interface of an application resident on end device 190, for downloading or streaming from set top box 210 of LAN 180. For example, the application may be a mobile application that supports OTT streaming and downloading of content. As previously described, the content may be stored on set top box 210 and end device 190 may not be connected to LAN 180 to which set top box 210 is connected. As an example, the content may be a movie, a television program, or other content that may be stored by set top box 210. The content may originate from a television service associated with user 195.

In block 510, end device 190 may transmit a request for a network address and status information of set top box 210, which stores the content, to notification server 205. Notification server 205 may route the request to set top box 210 via router 210 or directly, as described herein. Notification server 205 may receive a response to the request from set top box 210, and transmit the response to end device 190.

In block 515, end device 190 may receive a response, which includes the network address and status information of the set top box, via notification server 205. In block 520, it may be determined whether the status information supports the prospective downloading or streaming session. For example, end device 190 may interpret the status information included in the response.

When it is determined that the status information does not support the downloading or streaming session of the selected content (block 520—NO), process 500 may end (block 525).

For example, the application, via the graphical user interface, may notify user 195, and user 195 may close the application of end device 190. Alternatively, user 195 may select a different content, and process 500 may return to step 505.

When it is determined that the status information does support the downloading or streaming session of the selected content (block 520—YES), end device 190 may transmit a request for port information of a router in LAN 180 to notification server 205. Notification server 205 may route the request to set top box 210, and in turn, set top box 210 may generate a request and transmit the request to router 215. Alternatively, notification server 205 may route the request to router 215. In either case, notification server 205 may receive a response and transmit the response to end device 190.

Referring to FIG. 5B, end device 190 may receive a response for port information from notification server 535. End device 190 may interpret the response, and in block 540, end device 190 may determine whether ports are available, opened, and/or assigned to support the prospective download or streaming of the selected content.

When it is determined that the port information is not available, opened, and/or assigned (block 540—NO), process 500 may end (block 545). For example, the application, via the graphical user interface, may notify user 195, and user 195 may close the application of end device 190. Alternatively, user 195 may select a different content, and process 500 may return to step 505.

When it is determined that the port information is available, opened, and/or assigned (block 540—YES), user 195 via the graphical user interface and end device 190, may establish and conduct a downloading or streaming session of the selected content with set top box 210 via router 215 and the port information.

FIGS. 5A and 5B illustrate an exemplary process 500 of the inter-networked content service, however, according to other embodiments, process 500 may include additional operations, fewer operations, and/or different operations than those illustrated in FIGS. 5A and 5B, and described herein. For example, process 500 may include an exemplary embodiment in which the port information pertains to set top box 210. Additionally, for example, the content session may be established and conducted directly with set top box 210 and without router 215.

Figure 6:
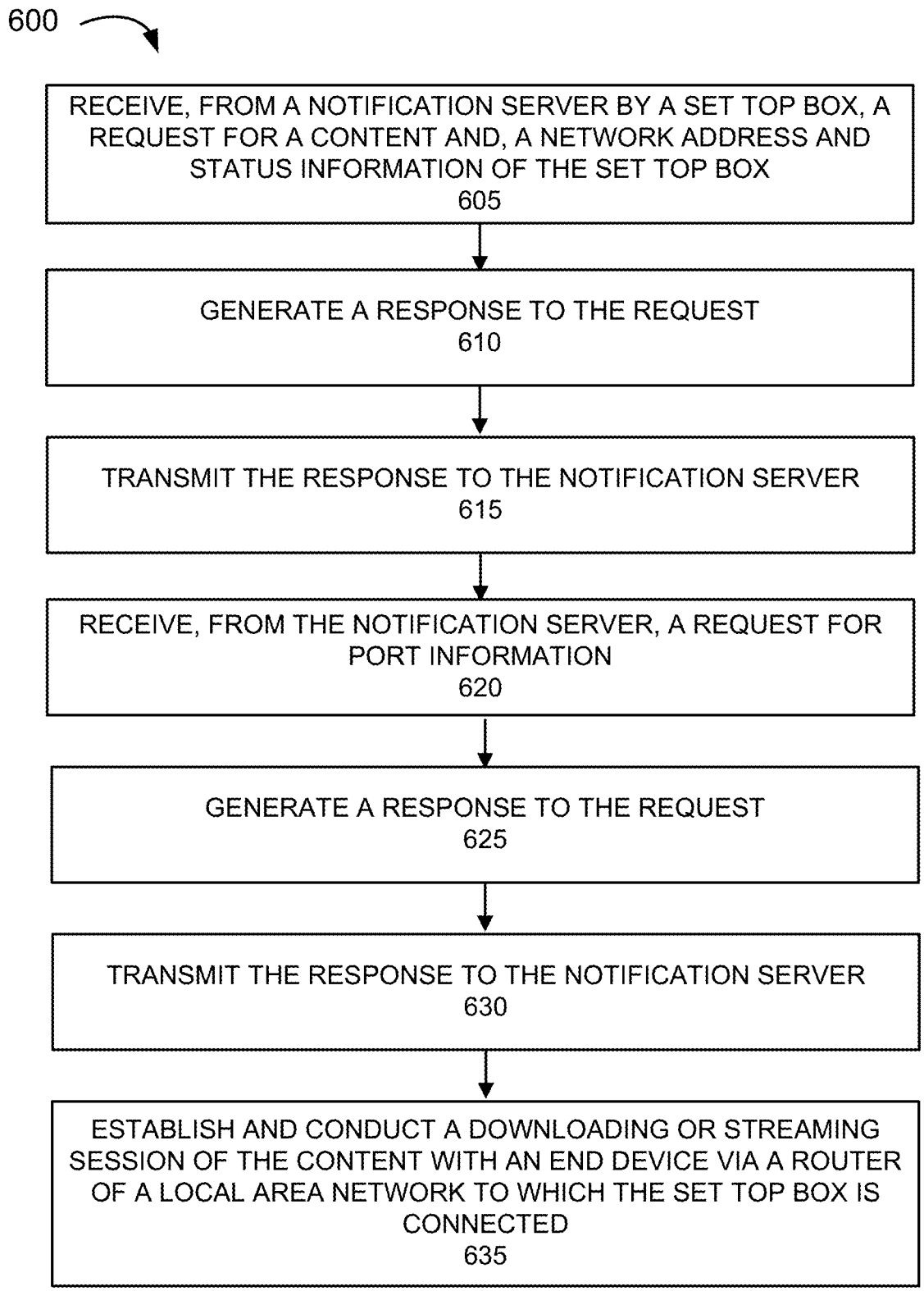
FIG. 6 is a flow diagram illustrating another exemplary process of an exemplary embodiment of the inter-networked content service.

FIG. 6 is a flow diagram illustrating another exemplary process 600 of an exemplary embodiment of the inter-networked content service. According to an exemplary embodiment, customer premises equipment 185 may perform steps of process 600. For example, according to an exemplary embodiment, set top box 210 may perform the steps of process 600. According to an exemplary implementation, processor 410 executes software 420 to perform a step illustrated in FIG. 6, and described herein. Alternatively, a step illustrated in FIG. 6 and described herein, may be performed by execution of only hardware. For purposes of description, process 600 of FIG. 6 assumes that set top box 210 stores the requested content, that status information of set top box 210 supports a downloading or streaming session for the requested content, and that ports in support of a downloading or streaming session are available, assigned, and/or opened.

In block 605, set top box 210 may receive a request, from notification server 205, for content stored at set top box 210, and a network address and status information of set top box 210.

In block 610, set top box 210 may generate a response to the request. The response may include an IP address and status information of set top box 210. The response may also indicate that the requested content is stored at set top box 210. In block 615, set top box 210 may transmit the response to notification server 205, as previously described.

In block 620, set top box 210 may receive a request from notification server 205 for port information. For example, the port information may pertain to router 210 and ports to be used in support of the prospective downloading or streaming session. The request may also indicate whether the content session is downloading or streaming. As previously described, set top box 210 may communicate with router 215, and obtain port values that may be used to support the content session, such as a port value for streaming, playback, and cryptography, and so forth, as previously described.

In block 625, set top box 210 may generate a response to the request for port information. For example, for a streaming session, the response may include an HLS port, a Web port, and a DTCP port. Additionally, for example, for a downloading session, the response may include a Web port and a DTCP port. In block 630, set top box 210 may transmit the response to notification server 205.

In block 635, set top box 210 may establish and conduct a downloading or streaming session of the content with end device 190 via router 215 of LAN 180 to which set top box 210 is connected.

FIG. 6 illustrates an exemplary process 600 of the inter-networked content service, however, according to other embodiments, process 600 may include additional operations, fewer operations, and/or different operations than those illustrated in FIG. 6, and described herein. For example, according to other exemplary embodiments, set top box 210 may determine that the content is not stored, and the response to the request for content, network address and status information may indicate that the content is not available. As such, process 600 may end. Alternatively, for example, set top box 210 may determine that ports are not available to support the prospective content session, and the response to the request for port information may indicate that the ports are not available. As such, process 600 may subsequently end. Additionally, or alternatively, set top box 210 may provide ports of set top box 210 and not router 215, as previously described.

Figure 7:
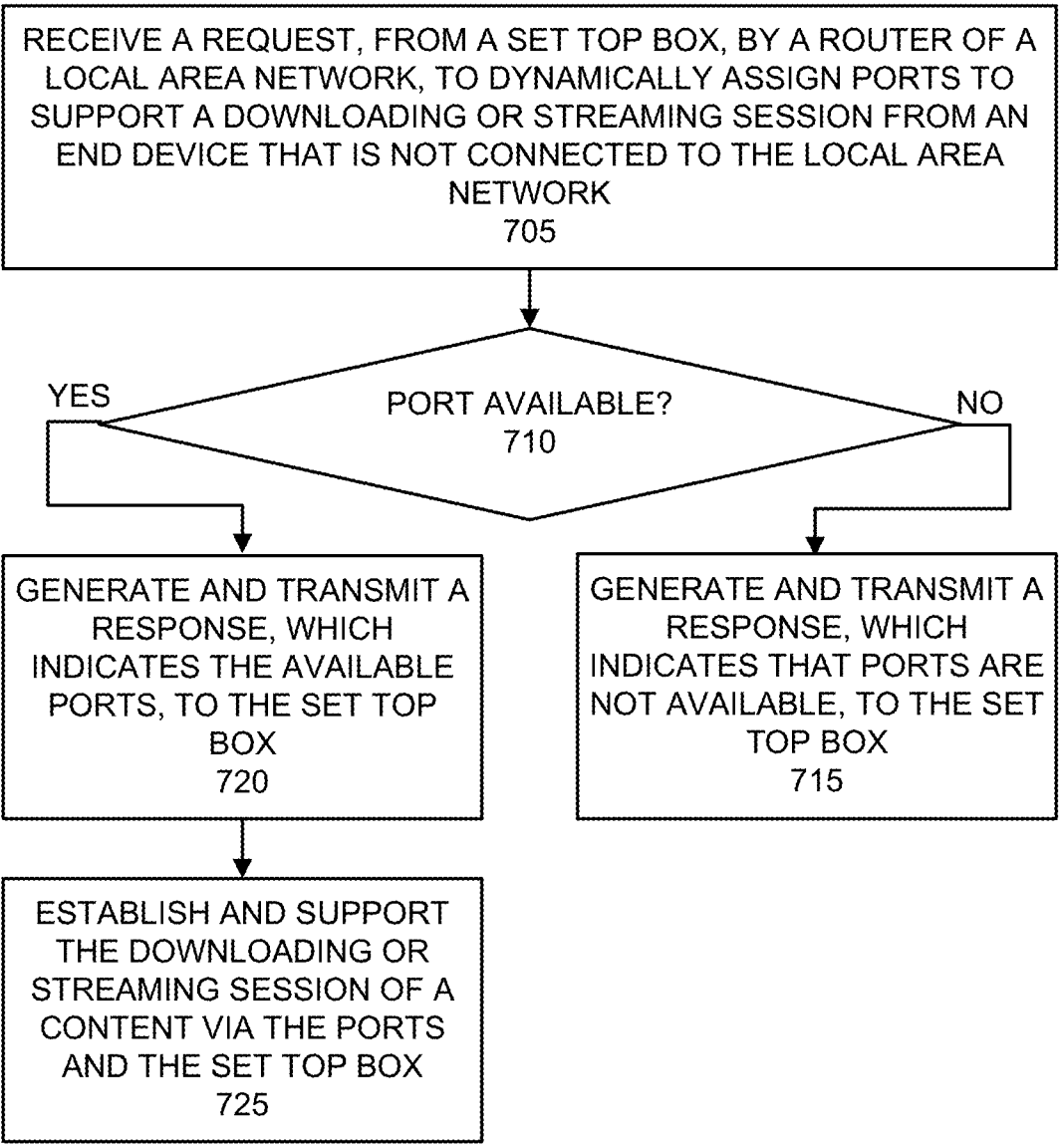
FIG. 7 is a flow diagram illustrating yet another exemplary process of an exemplary embodiment of the inter-networked content service

FIG. 7 is a flow diagram illustrating yet another exemplary process 700 of an exemplary embodiment of the inter-networked content service. According to an exemplary embodiment, customer premises equipment 185 may perform steps of process 700. For example, according to an exemplary embodiment, router 215 may perform the steps of process 700. According to an exemplary implementation, processor 410 executes software 420 to perform a step illustrated in FIG. 7, and described herein. Alternatively, a step illustrated in FIG. 7 and described herein, may be performed by execution of only hardware.

In block 705, router 215 may receive a request, from set top box 210 of LAN 180, to dynamically assign ports to support a downloading or streaming session from end device 190, which is not connected to LAN 180. According to some exemplary implementations, the request may indicate whether the content session is a download session or a streaming session. The request may be of a proprietary, customized, and/or LAN-specific protocol (e.g., an in-home communication protocol, a customized internal gateway device protocol, etc.).

In block 710, router 215 may determine whether the ports are available for dynamic assignment and use in support of the prospective downloading or streaming session of content. For example, router 215 may identify the number and type of ports to support the requested session, and determine whether there are ports available (e.g., among a pool of ports). For example, for a download session, router 215 may not assign a port for playback commands.

When it is determined that there are not ports available (block 710—NO), router 215 may generate and transmit a response, which indicates that ports are not available, to set top box 210 (block 715). When it is determined that there are ports available (block 710—YES), router 215 may generate and transmit a response, which indicates the available ports, to set top box 210 (block 720).

In block 725, router 215 may establish and support the downloading or streaming session of a content via the ports and set top box 210.

FIG. 7 illustrates an exemplary process 700 of the internetworked content service, however, according to other embodiments, process 700 may include additional operations, fewer operations, and/or different operations than those illustrated in FIG. 7, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5A, 5B, 6, and 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    receiving, by a set top box of a local area network from a push notification device external to the local area network, a first request, wherein the first request includes a request for content, and a request for a network address and status information of the set top box;
    generating, by the set top box in response to receiving the first request, a first response that includes the network address and status information of the set top box, wherein the status information indicates that the set top box can support a prospective downloading or streaming session of the content;

transmitting, by the set top box to the push notification device, the first response;

receiving, by the set top box from the push notification device, a second request for port information that would support the prospective downloading or streaming session of the content by an end device;

generating, by the set top box in response to receiving the second request, a second response that includes the port information;

transmitting, by the set top box to the push notification device, the second response; and transmitting, by the set top box to the end device, the content, wherein the end device is not directly connected to the local area network.

2. The method of claim 1, wherein the port information pertains to a router of the local area network, and the method further comprising:

generating, by the set top box, a third request to dynamically assign ports to support the prospective downloading or streaming session of the content;

transmitting, by the set top box to the router, the third request; and receiving, by the set top box from the router, a third response that includes the port information.

3. The method of claim 2, wherein the transmitting of the content to the end device is via the router.

4. The method of claim 1, further comprising:

determining, by the set top box in response to receiving the first request, that the content is stored at the set top box, and that the set top box is not subject to an error that prevents supporting the prospective downloading or streaming session of the content.

5. The method of claim 1, wherein the port information pertains to the set top box.

6. The method of claim 1, wherein the first request includes a set top box token of the set top box and associated with a push notification service.

7. The method of claim 1, wherein, when the prospective downloading or streaming session is a streaming session, the port information of the second response indicates a port value to be used for streaming, a port value to be used for communicating playback commands, and a port value to be used for security key exchange.

8. The method of claim 1, wherein the set top box is in-home customer premises equipment associated with a television service and a user of the end device.

9. A device comprising:

a communication interface;

a memory, wherein the memory stores instructions; and a processor, wherein the processor executes the instructions to:

receive, via the communication interface from a push notification device external to a local area network, a first request, Wherein the first request includes a request for content, and a request for a network address and status information of the device, and wherein the device is a set top box and of the local area network:

generate, in response to the receipt of the first request, a first response that includes the network address and status information of the set top box, wherein the status information indicates that the set top box can support: a prospective downloading or streaming session of the content by an end device;

transmit, via the communication interface to the push notification device, the first response;

receive, via the communication interface from the push notification device, a second request for port information that would support the prospective downloading or streaming session of the content;

generate, in response to the receipt of the second request, a second response that includes the port information;

transmit, via the communication interface to the push notification device, the second response; and transmit, via the communication interface, to the end device, the end device, wherein the end device is not directly connected to the local area network.

10. The device of claim 9, wherein the port information pertains to a router of the local area network, and wherein the processor further executes the instructions to:

generate a third request to dynamically assign ports to support the prospective downloading or streaming session of the content;

transmit, via the communication interface to the router, the third request; and receive, via the communication interface from the router, a third response that includes the port information.

11. The device of claim 10, wherein the transmission of the content to the end device is via the router.

12. The device of claim 9, wherein the processor further executes the instructions to:

determine, in response to the receipt of the first request, that the content is stored at the set top box, and that the set top box is not subject to an error that prevents supporting the prospective downloading or streaming session of the content.

13. The device of claim 9, wherein the port information pertains to the set top box.

14. The device of claim 9, wherein the first request includes a set top box token of the set top box and associated with a push notification service.

15. The device of claim 9, wherein, when the prospective downloading or streaming session is a streaming session, the port information of the second response indicates a port value to be used for streaming, a port value to be used for communicating playback commands, and a port value to be used for security key exchange.

16. The device of claim 9, wherein the set top box is in-home customer premises equipment associated with a television service and a user of the end device.

17. A non-transitory computer-readable storage medium storing instructions executable by a processor of a device, which when executed cause the device to:

receive, from a push notification device external to a local area network, a first request, Wherein the first request includes a request for content, and a request for a network address and status information of the device, wherein the device is a set top box and of the local area network;

generate, in response to the receipt of the first request, a first response that includes the network address and status information of the set top box, wherein the status information indicates that the set top box can support a prospective downloading or streaming session of the content by an end device;

transmit, to the push notification device, the first response;

receive, from the push notification device, a second request for port information that would support the prospective downloading or streaming session of the content;

generate, in response to the receipt of the second request, a second response that includes the port information;

transmit, to the push notification device, the second response; and transmit to the end device, the content, wherein the end device is not directly connected to the local area network.

18. The non-transitory computer-readable storage medium of claim 17, wherein the port information pertains to a router of the local area network, and wherein the instructions further comprise instructions, which when executed cause the device to:

generate a third request to dynamically assign ports to support the prospective downloading or streaming session of the content;

transmit to the router, the third request; and receive, from the router, a third response that includes the port information.

19. The non-transitory computer-readable storage medium of claim 17, wherein, when the prospective downloading or streaming session is a streaming session, the port information of the second response indicates a port value to be used for streaming, a port value to be used for communicating playback commands, and a port value to be used for security key exchange.

20. The non-transitory computer-readable storage medium of claim 17, wherein the set top box is in-home customer premises equipment associated with a television service and a user of the end device.

\* \* \* \* \*